(12) United States Patent
Yoshida et al.

(10) Patent No.: US 7,015,447 B2
(45) Date of Patent: Mar. 21, 2006

(54) ILLUMINANCE CALIBRATING METHOD OF ILLUMINATOR, ILLUMINANCE CALIBRATION CONTROLLER OF ILLUMINATOR, ILLUMINANCE CALIBRATING PROGRAM OF ILLUMINATOR, RECORDING MEDIUM STORING THE PROGRAM AND MEASURING TOOL

(75) Inventors: Hiroyuki Yoshida, Kawasaki (JP); Tatsuya Nagahama, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 273 days.

(21) Appl. No.: 10/754,743

(22) Filed: Jan. 9, 2004

(65) Prior Publication Data

US 2005/0007604 A1    Jan. 13, 2005

(30) Foreign Application Priority Data

Jan. 10, 2003    (JP)    ............................... 2003-004106

(51) Int. Cl.
*G01J 1/32* (2006.01)
(52) U.S. Cl. .................... 250/205; 315/151; 315/158
(58) Field of Classification Search ................ 250/205; 315/149, 151, 156, 158; 358/475
See application file for complete search history.

(56) References Cited

U.S. PATENT DOCUMENTS

| | | | | |
|---|---|---|---|---|
| 4,900,912 A | * | 2/1990 | Shoji | 250/205 |
| 5,220,840 A | * | 6/1993 | Neigoff et al. | 73/865.6 |
| 5,514,864 A | | 5/1996 | Mu-Tung et al. | 250/205 |
| 5,828,178 A | * | 10/1998 | York et al. | 315/151 |
| 6,239,554 B1 | | 5/2001 | Tessadro et al. | 315/149 |
| 6,303,916 B1 | * | 10/2001 | Gladnick | 250/205 |
| 6,303,917 B1 | * | 10/2001 | Hawryluk | 250/205 |
| 2002/0014864 A1 | | 2/2002 | Gemunder et al. | 315/291 |

* cited by examiner

*Primary Examiner*—Thanh X. Luu
*Assistant Examiner*—Stephen Yam
(74) *Attorney, Agent, or Firm*—Rankin, Hill, Porter & Clark LLP

(57) ABSTRACT

An illuminance calibrating method includes a light-receiving intensity measuring step (ST100) for measuring a relationship between an applied current value and a light-receiving intensity of a CCD camera of which exposure time is capable of being changed by taking an image of an illumination from an illuminator by the CCD camera while changing the exposure time of the CCD camera, a characteristic curve calculating step (ST200) for calculating a characteristic curve of the illumination intensity of the illuminator and the applied current value based on the result obtained in the light-receiving intensity measuring step (ST100), and a command-value/current-value table generating step (ST300) for generating a table of the command value and the applied current value based on the calculated characteristic curve.

9 Claims, 14 Drawing Sheets

FIG. 4

| COMMAND VALUE i [%] | APPLIED CURRENT VALUE | | | | INCIDENT ILLUMINATOR | TRANSMISSIVE ILLUMINATOR |
|---|---|---|---|---|---|---|
| | RING ILLUMINATOR | | | | | |
| | Front | Back | Left | Right | | |
| 10 | 8761 | 9462 | 9457 | 8956 | 2491 | 1907 |
| 20 | 12103 | 12861 | 12700 | 11958 | 4384 | 3016 |
| 30 | 15451 | 16268 | 15973 | 14969 | 6588 | 4084 |
| 100 | 41630 | 42914 | 41027 | 38033 | 29863 | 11705 |

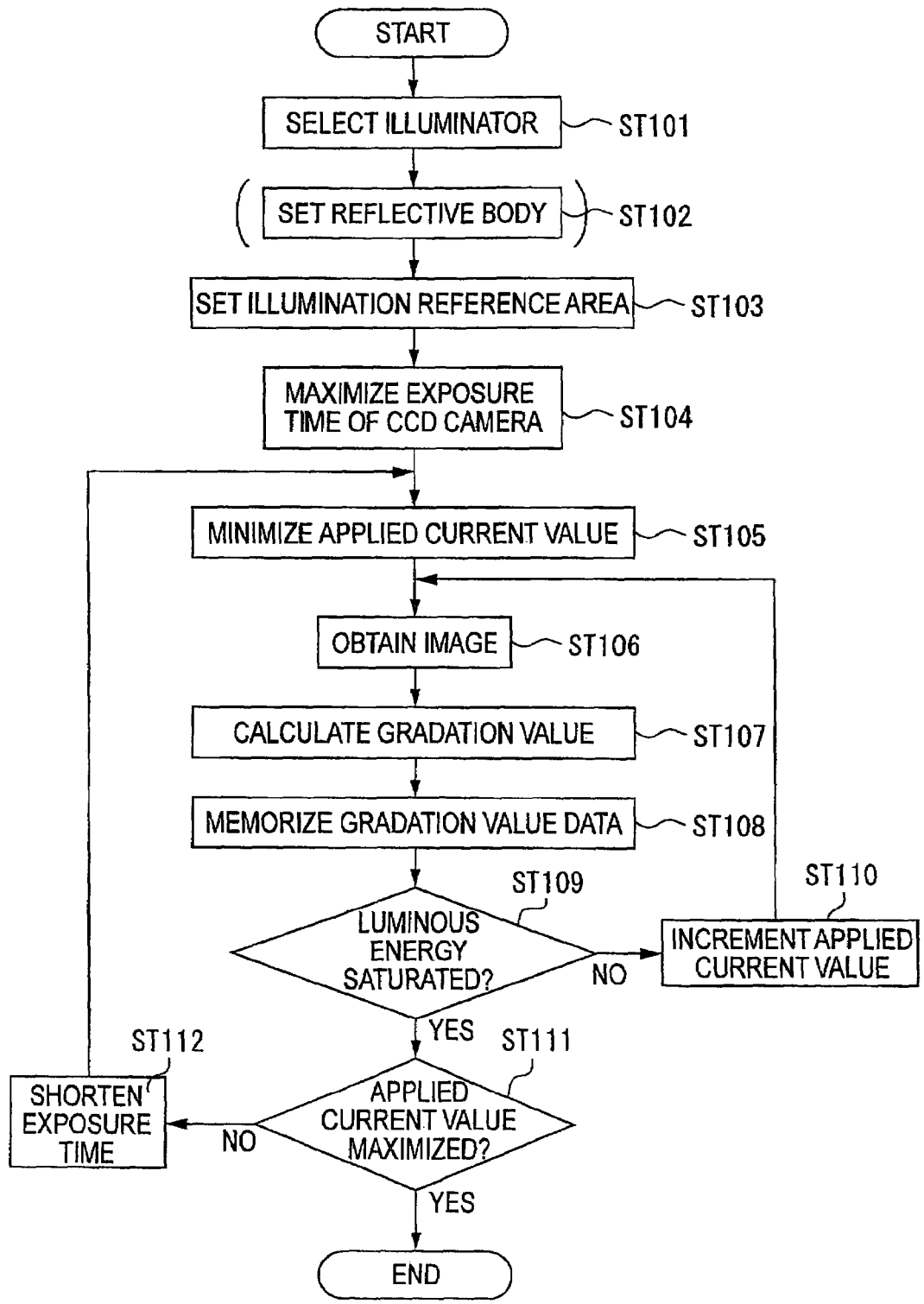

FIG. 8

| | RING ILLUMINATOR | REFLECTED ILLUMINATOR | TRANSMISSIVE ILLUMINATOR |
|---|---|---|---|
| ILLUMINATOR TYPE | WHITE LED | HALOGEN LAMP | GREEN LED |
| REFERENCE WORKPIECE OF REFLECTION | CERAMIC GAUGE BLOCK | METAL GAUGE BLOCK | NO (DIRECTLY INCIDENT) |
| CCD EXPOSURE TIME [sec] | 2, 1, 1/2, 1/5, 1/10, 1/20, 1/50, 1/100, 1/200, 1/500, 1/1000, 1/2000, 1/5000, 1/10000, ... | | |
| APPLIED CURRENT VALUE | 0 ~ 4096 (WHEN APPLIED CURRENT VALUE IS CONTROLLED BY 12 BITS) | | |

CURRENT COMMAND VALUE

GRADATION VALUE OUTPUTTED BY CCD

ILLUMINANCE CALIBRATING METHOD OF ILLUMINATOR, ILLUMINANCE CALIBRATION CONTROLLER OF ILLUMINATOR, ILLUMINANCE CALIBRATING PROGRAM OF ILLUMINATOR, RECORDING MEDIUM STORING THE PROGRAM AND MEASURING TOOL

BACKGROUND OF THE INVENTION

1. Field of the Invention

The present invention relates to an illuminance calibrating method of an illuminator, illuminance calibration controller of an illuminator, illuminance calibrating program of an illuminator, recording medium storing the program and a measuring tool. For instance, it relates to an illuminance calibrating method of an illuminator that calibrates an illuminance of an illumination light irradiated by an illuminator having a light source capable of changing the illuminance thereof in accordance with applied current value.

2. Description of Related Art

Image-processing measuring tools having an illuminator that irradiates a light beam toward a workpiece, an image pickup device that receives the light reflected by the workpiece, and an image processor that obtains the profile of the workpiece by processing the image received by the image pickup device have been known.

The illuminator has a plurality of light sources, an current controller that controls the electric current applied to the respective light sources, and an input device capable of being operated from the outside to input the illuminance of the illumination light as a command value.

In the above device, a user commands the illuminance of the illumination light by an input device. Then, the current controller applies a predetermined electric current to the respective light sources so that the illumination light of a commanded illuminance is irradiated therefrom. By applying the electric current, the illumination light of the commanded illuminance is irradiated on the workpiece. The light reflected by the workpiece is received by the image pickup device and the profile and/or dimension of the workpiece is measured by detecting the edges of the imported image.

In the image measurement, the illuminance of the illumination light irradiated on the workpiece is of extreme importance. For instance, when the actual illuminance of the illumination light is low relative to the commanded illuminance, the image cannot be taken or the edge of the image cannot be detected on account of insufficient luminous energy. On the other hand, when the actual illuminance is high relative to the commanded illuminance, the light is saturated and the image is blurred (i.e. over-illuminated) so that the edge cannot be detected.

As described above, accurate control of the illuminance of the illumination light by controlling the electric current applied on the respective light sources is extremely important for precise measurement.

However, since the light sources have individual differences for each product, the illuminance differs for each individual product even when the same electric current is applied as specified therefor. Then, the illuminance of the illumination light becomes different for each illuminators even when the same electric current is applied.

In view of the above, an illuminance meter for measuring the illuminance of the illumination light is used to measure the relationship between the applied electric current and the illuminance of the illumination light. By calculating the applied current value required for obtaining commanded illumination light based on the data, the relationship between the applied current value and the illuminance is calibrated for each illuminator.

However, an illuminance meter is very expensive, which amounts to a couple of hundred thousand yen (three hundred thousand yen, for instance). A lot of cost is requested for a user if he has to purchase such an illuminance meter in order to calibrate the illuminance of the illuminator.

Further, the illuminance meter requires a couple of seconds of time for one measurement. A huge amount of time is required for measuring the relationship between the applied current value and the illuminance by a couple of hundreds or a thousand steps.

SUMMARY OF THE INVENTION

An object of the present invention is to provide an illuminance calibrating method of an illuminator, an illumination calibration controller of an illuminator, an illumination calibrating program of an illuminator, a recording medium storing the program and a measuring tool capable of calibrating the illuminance of an illuminator in an inexpensive and rapid manner.

An illuminance calibrating method of an illuminator according to an aspect of the present invention is for an illuminator having a light source capable of changing illuminance thereof according to an applied current value, the illuminator irradiating an illumination light of an illuminance in accordance with a command value inputted from the outside for commanding the illuminance of the illumination light, the method having: a light-receiving intensity measuring step for taking an image of the illumination light from the illuminator by an image pickup device capable of changing an exposure time thereof to measure the relationship between the applied current value and a light-receiving intensity of the image pickup device while changing the exposure time; a characteristic curve calculating step for calculating a characteristic curve of an intensity of the illumination light of the illuminator and the applied current value based on the result of the light-receiving intensity measuring step; and a command-value/current-value table generating step for generating a table storing the command value and the applied current value based on the calculated characteristic curve.

According to the above arrangement, the relationship between the applied current value and the light-receiving intensity is measured in the light-receiving intensity measuring step while changing the exposure time of the image pickup device.

When the exposure time is short, since only a small amount of luminous energy is incident on the image pickup device, the luminous energy is not saturated even when the illuminance of the illumination light is high by applying large electric current. Accordingly, the relationship between the applied current value and the light-receiving intensity can be obtained over a wide range. However, the resolution of the gradation of the image pickup device is low when the exposure time is short. On the other hand, when the exposure time is lengthened, though the resolution of the gradation of the image pickup device can be enhanced, since the luminous energy is rapidly saturated when the exposure time is long, the light-receiving intensity cannot be measured when high electric current is applied.

Accordingly, the relationship between the applied current value and the light-receiving intensity is obtained while changing the exposure time from the long exposure time to the short exposure time. Then, when the exposure time is short, the data of the applied current value can be obtained over a wide range and, when the exposure time is long, a data with high gradation resolution can be obtained.

During the characteristic curve calculating step, the relationship between the intensity of the illumination light of the illuminator and the applied current value is calculated as a characteristic curve. Though the light-receiving intensity of the image pickup device is obtained in the light-receiving intensity measuring step, the light-receiving intensity takes different value for the same applied current value on account of different luminous energy accumulated during different exposure time. However, though the light-receiving intensity is a relative value, the illuminance from the illuminator is equal for the same applied current value. Accordingly, the light-receiving intensity for each exposure time is supposed to be on a single curve when the relative scales of the light-receiving intensity obtained for each exposure time are converted into a uniform scale. The curve can be set as the characteristic curve representing the relationship between the applied current value and the illumination intensity.

The relationship between the applied current value and the illumination intensity can be understood from the characteristic curve, so that a table storing the relationship between the command value and the applied current value is generated by reading out the applied current value corresponding to the intensity of the illumination light commanded by the command value.

Then, when an illuminance is commanded by the command value, the applied current value corresponding to the command value is read out from the table. When the current value is applied to the light source, the illumination light of the illuminance commanded by the command value is irradiated.

When the relationship between the applied current value and the illuminance of the illumination light is obtained, the image of the illumination light is taken by the image pickup device to obtain the light-receiving intensity. The image pickup device is a device having a light-receiving element that outputs an electric signal by photoelectric conversion in accordance with the received light such as a CCD camera. Such CCD cameras are remarkably inexpensive as compared to an illuminance meter. Further, since such image pickup device is usually annexed to the image-processing measuring tool as a set with the illuminator for taking the image of the object illuminated by the illuminator, it is not required to purchase an independent image pickup device.

Further, since a general image pickup device can take dozens of frame in one second, the measuring time can be substantively reduced as compared to the illuminance meter.

Since the luminous energy is rapidly saturated in the image pickup device, the relationship between the applied current value and the illuminance of the illumination cannot be simply obtained by the image pickup device. However, by adjusting the luminous energy incident on the image pickup device by changing the exposure time, the relationship between the applied current value and the light-receiving intensity can be obtained over a wide range. By converting the light-receiving intensity of each exposure time into a single characteristic curve, the relationship between the applied current value and the illumination intensity can be obtained.

In the above aspect of the present invention, the characteristic curve calculating step may preferably include: a reference characteristic curve generating step for generating a reference characteristic curve having a reference scale of the light-receiving intensity obtained in the exposure time capable of obtaining the light-receiving intensity on the entirety of the applied current value to be calibrated; and a light-receiving intensity converting step for converting the scale of the light-receiving intensity obtained at each exposure time to superpose on the reference characteristic curve.

According to the above arrangement, in the reference characteristic curve generating step, the measurement data that can obtain the relationship between the applied current value and the light-receiving intensity over a wide range, in other words, the light-receiving intensity obtained over the entire applied current value to be calibrated without saturating the luminous energy by adjusting the exposure time into a short time is set as a reference scale. At this time, in order to represent the reference scale in a percentage, the light-receiving intensity at the maximum applied current value may be set as 100%.

In the light-receiving intensity converting step, the scale is converted so that the light-receiving intensity for each exposure time is superposed on the reference characteristic curve. Since the light-receiving intensity is a relative value, the scale can be voluntarily converted, and the illuminance of the illumination light should be actually the same for the same applied current value, so that the all the light-receiving intensity can be superposed on a single curve by converting the light-receiving intensity into a common scale. At this time, the light-receiving intensity may be converted into a reference scale, percentage for instance, according to a predetermined conversion formula. Then, the light-receiving intensity of all the exposure time can be superposed on the reference characteristic curve to be converted as a single curve so that the relationship between the applied current value and the illumination intensity can be obtained.

Incidentally, the exposure time for obtaining the light-receiving intensity for the reference characteristic curve may preferably be set at a time period without saturating the luminous energy when the maximum electric current to be calibrated is applied. For instance, when the exposure time is initially set long and the light-receiving intensity is acquired while gradually reducing the exposure time so that the luminous energy is not saturated at the maximum value of the applied current value, the exposure time may be set at the time when the light-receiving intensity initially can be obtained to the maximum applied current value while reducing the exposure time. Then, the longest exposure time can be obtained within the exposure time without saturating the luminous energy at the maximum applied current value, so that the light-receiving intensity having the highest resolution within the range where the light-receiving intensity can be obtained until reaching the maximum applied current value can be set as the reference scale.

In the above, a pasting step for extracting and pasting an effective value from the value converted by the light-receiving intensity converting step may preferably be provided, in which the value converted by the light-receiving intensity obtained at the longest exposure time for the same applied current value may preferably be selected as the effective value.

According to the above arrangement, the most effective value is extracted from the converted light-receiving intensity data in the pasting step. Since the applied current value and the light-receiving intensity are measured while changing the exposure time, the resolution can be improved by lengthening the exposure time to increase the luminous energy. The accuracy of the characteristic curve can be improved by extracting the data with the high resolution. By improving the accuracy of the characteristic curve, the illuminance calibration accuracy can be improved. Incidentally, the longest exposure time refers to the longest exposure time among the exposure time where the light-receiving intensity can be effectively obtained without saturating the luminous energy received by the image pickup device.

In the above, the characteristic curve calculating step may preferably include: a light-receiving characteristics estimating step for estimating the characteristic of the image pickup device based on a pasting error of the characteristic curve in the pasting step; and a light-receiving intensity correcting step for correcting the light-receiving intensity based on the light-receiving characteristics estimated in the light-receiving characteristics estimating step.

According to the above arrangement, the light-receiving characteristics of the image pickup device is estimated in the light-receiving step. Though the output of image pickup devices generally is in proportion to the incident luminous energy, the proportionality may not be satisfied according to the incident luminous energy. For instance, the photoelectric conversion rate of a CCD camera relative to the luminous energy tends to become small where a great amount of luminous energy is applied. Accordingly, the light-receiving intensities obtained while changing the exposure time, i.e. the light-receiving intensities measured in various luminous energies are compared to estimate the light-receiving characteristics of the image pickup device.

In the light-receiving intensity correcting step, the light-receiving intensity is corrected based on the estimated light-receiving characteristics. Then, accurate light-receiving intensity data in accordance with the luminous energy can be obtained, so that accurate characteristic curve can be obtained. An accurate calibration can be conducted using the accurate characteristic curve.

In the above, the command-value/current-value table generating step may preferably include: an illuminance control curve setting step for setting an illuminance control curve representing a relationship between the command value and the illuminance commanded by the command value; and an applied current value reading step for reading the applied current value from the characteristic curve in accordance with the illuminance read out corresponding to the command value based on the illuminance control curve.

According to the above arrangement, the relationship between the command value and the illuminance to be commanded by the command value is set in the illuminance control curve setting step. The illuminance control curve may be set in advance, or alternatively, may be voluntarily set by a user.

In the applied current value reading step, the illuminance relative to the command value is initially read out in accordance with the illuminance control curve. Further, the applied current value corresponding to the illuminance is read out in accordance with the characteristic curve. Then, the applied current value relative to the command value can be fetched. When the table storing the applied current value relative to the command value is provided, the illumination light can be irradiated by the illuminance in accordance with the command value according to the illuminance control curve.

An illuminance calibration controller of an illuminator according to another aspect of the present invention is for an illuminator having a light source capable of changing illuminance thereof according to an applied current value, the illuminator irradiating an illumination light of an illuminance in accordance with a command value inputted from the outside for commanding the illuminance of the illumination light, the controller having: a light-receiving intensity measuring device for taking an image of the illumination light from the illuminator by an image pickup device capable of changing an exposure time thereof to measure the relationship between the applied current value and a light-receiving intensity of the image pickup device while changing the exposure time; a characteristic curve calculating device for calculating a characteristic curve of an intensity of the illumination light of the illuminator and the applied current value based on the result of the light-receiving intensity measuring device; and a command-value/current-value table generating device for generating a table storing the command value and the applied current value based on the calculated characteristic curve.

According to the above aspect of the present invention, the same function and advantages as the above method can be obtained.

When the illuminance is commanded by the command value, the current value is read out from the command-value/current-value table and the current value is applied on the light source so that the illumination light of the illuminance commanded by the command value is irradiated.

An image pickup device is extremely inexpensive as compared to an illuminance meter. Further, since such image pickup device is usually annexed to the illuminator as a set for taking the image of the object illuminated by the illuminator, it is not required to purchase an independent image pickup device.

Further, since a general image pickup device can take dozens of frame in one second, the measuring time can be substantively reduced as compared to the illuminance meter.

By adjusting the luminous energy incident on the image pickup device while changing the exposure time, the relationship between the applied current value and the light-receiving intensity can be widely obtained. By converting the light-receiving intensity of each exposure time into a single characteristic curve, the relationship between the applied current value and the illumination intensity of the illumination can be obtained.

An illuminance calibrating program of an illuminator according to still another aspect of the present invention is used for an illuminator having a light source capable of changing illuminance thereof according to an applied current value, the illuminator irradiating an illumination light of an illuminance in accordance with a command value inputted from the outside for commanding the illuminance of the illumination light, and a controller that controls the illuminance of the illuminator, the controller installed with a computer, the program operating the computer as: a light-receiving intensity measuring device for taking an image of the illumination light from the illuminator by an image pickup device capable of changing an exposure time thereof to measure the relationship between the applied current value and a light-receiving intensity of the image pickup device while changing the exposure time; a characteristic curve calculating device for calculating a characteristic curve of an intensity of the illumination light of the illuminator and the applied current value based on the result obtained by the light-receiving intensity measuring device; and a command-value/current-value table generating device for generating a table storing the command value and the applied current value based on the calculated characteristic curve.

A computer-readable recording medium according to further aspect of the present invention stores an illuminance calibrating program of an illuminator having a light source capable of changing illuminance thereof according to an applied current value, the illuminator irradiating an illumination light of an illuminance in accordance with a command value inputted from the outside for commanding the illuminance of the illumination light, and a controller that controls the illuminance of the illuminator, the controller installed with a computer, the program operating the computer as: a light-receiving intensity measuring device for taking an image of the illumination light from the illuminator by an image pickup device capable of changing an exposure time thereof to measure the relationship between the applied current value and a light-receiving intensity of the image pickup device while changing the exposure time; a characteristic curve calculating device for calculating a characteristic curve of an intensity of the illumination light of the illuminator and the applied current value based on the result obtained by the light-receiving intensity measuring device; and a command-value/current-value table generating device for generating a table storing the command value and the applied current value based on the calculated characteristic curve.

According to the above aspect of the present invention, the same function and advantages as the above method can be obtained. By installing a computer that has a CPU (central processing unit) and a memory (storage) and arranging the program so that the computer works as the respective devices, the parameters of each device can be easily changed. The program may be stored in the recording medium and be installed in a computer by directly plugging the recording medium to the computer, or alternatively, a reader device may be externally attached to the computer to install the program in the computer through the reader device. Incidentally, the program may be supplied and installed in the computer through a communication line such as the Internet, LAN cable and telephone line or by wireless.

A measuring tool according to still further aspect of the present invention has: the above illumination calibration controller of an illuminator; the illuminator for irradiating the illumination light toward the workpiece; an image pickup device for taking an image of the light reflected by the workpiece; and an image processor for processing the image taken by the image pickup device to measure the profile of the workpiece.

According to the above arrangement, the illumination light is irradiated from the illuminator toward the workpiece. The image of the light reflected by the workpiece is taken by the image pickup device. The image taken by the image pickup device is processed by the image processor to detect the edge thereof and the like to measure the profile and/or the dimension of the workpiece.

Since the illumination calibration controller of an illuminator is provided and the illuminance of the illuminator is calibrated by the illuminance calibration controller, the illumination light can be irradiated on the workpiece by the illuminator with the illuminance in accordance with the command value. Since the illumination light with the illuminance commanded by the command value is irradiated on the workpiece, the image can be clearly taken. Accordingly, the image-processing can be accurately conducted. As a result, the profile and/or the dimension of the workpiece can be accurately measured.

BRIEF DESCRIPTION OF THE DRAWINGS

FIG. 4 is an illustration showing a command-value/current-value table representing the relationship between the command value and the applied current value;

FIG. 6 is a flowchart showing a light-receiving intensity measuring step;

FIG. 8 is an illustration summarizing measuring conditions;

DETAILED DESCRIPTION OF PREFERRED EMBODIMENT(S)

An embodiment of the present invention will be described below with reference to attached drawings.

Figure 1:
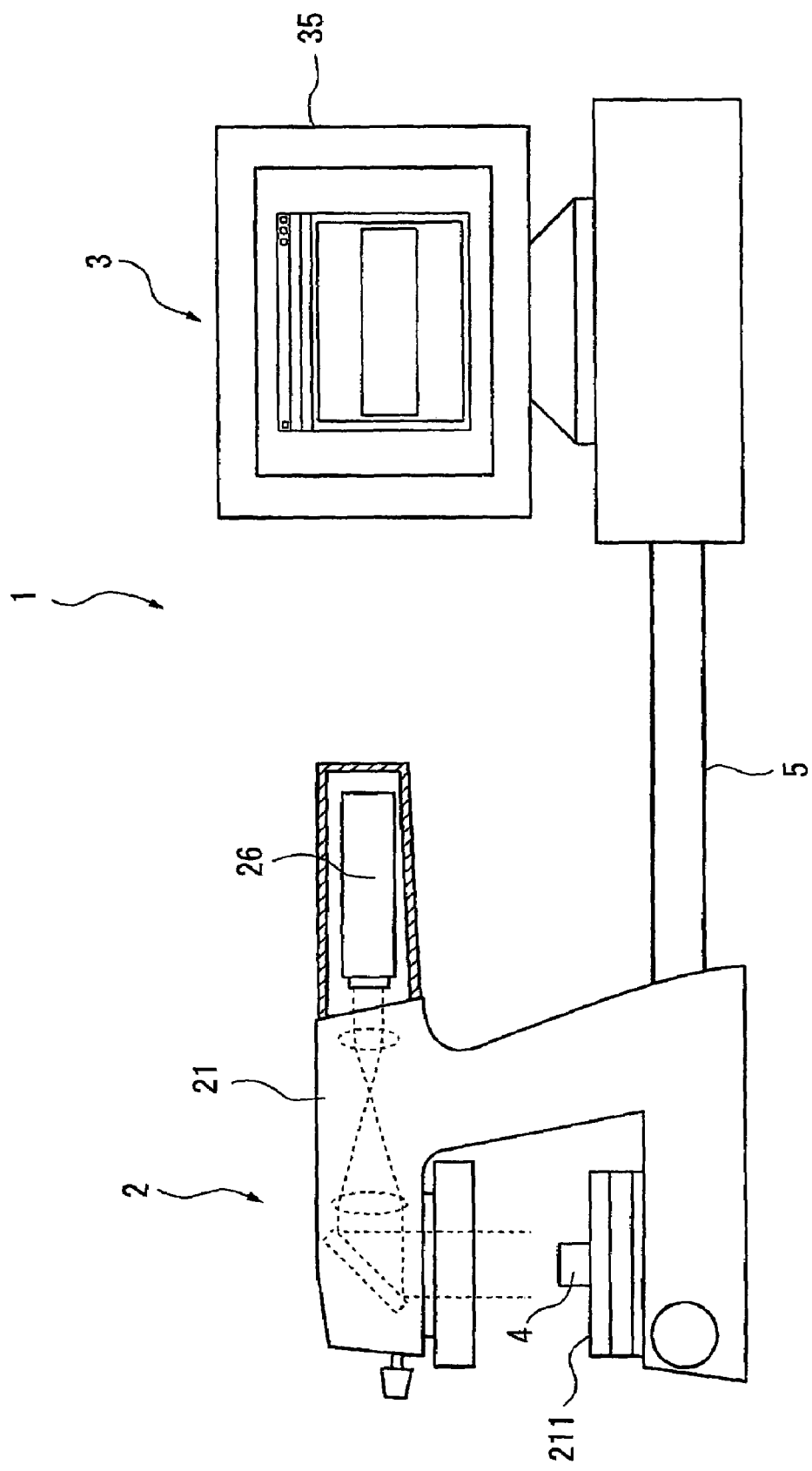
FIG. 1 is an illustration showing an arrangement of an image-processing measuring tool according to an embodiment of the present invention.

FIG. 1 shows an image-processing measuring tool 1 for measuring a profile of a workpiece 4 from an image obtained by irradiating an illumination light on the workpiece 4 and catching the light reflected by the workpiece 4.

The image-processing measuring tool 1 has a measuring tool body 2 and a controller 3 for controlling the operation of the measuring tool body 2, the measuring tool body 2 and the controller 3 being connected through a cable.

The measuring tool body 2 has a body frame 21, an illuminator 22 (not shown in FIG. 1) provided on the body frame 21 for irradiating an illumination light on the workpiece 4, an image pickup device 26 provided on the body frame 21 for receiving the light reflected by the workpiece 4.

Figure 2:
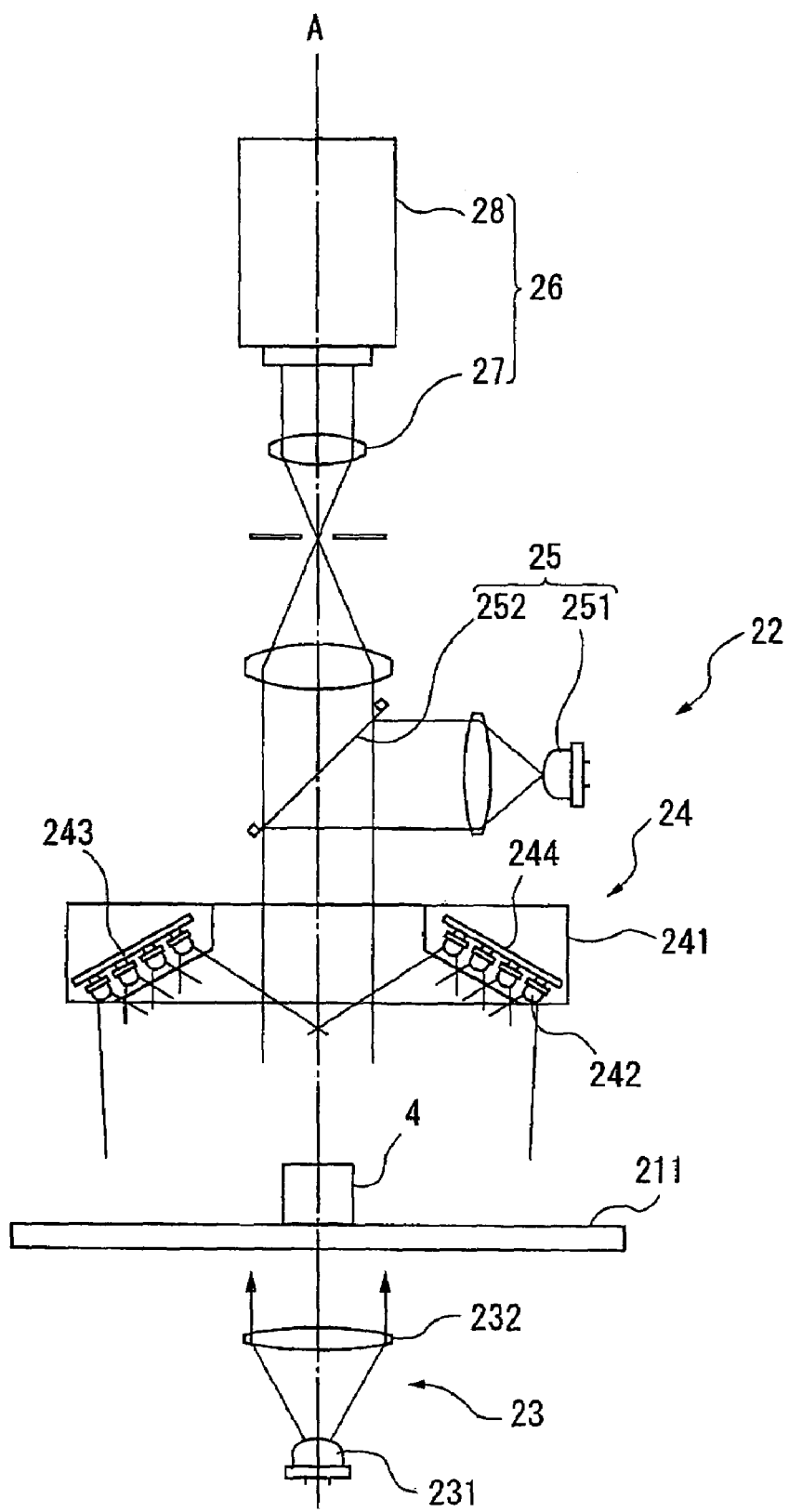
FIG. 2 is an illustration showing an illuminator and an image pickup device.

FIG. 2 shows an outline of the illuminator 22 and the image pickup device 26.

The illuminator 22 includes a transmissive illuminator 23 that irradiates an illumination light toward the workpiece 4 from a side opposite to the image pickup device 26 sandwiching the workpiece 4, ring illuminators 24 provided around an optical axis A extending from the workpiece 4 to the image pickup device 26 and angled relative to the optical axis A, and an incident illuminator 25 that irradiates an illumination light from right above the workpiece along the optical axis A.

The transmissive illuminator 23 irradiates the illumination light from right below a light-transmissive stage 211 for the workpiece 4 to be put on toward the workpiece. The light source of the transmissive illuminator 23 is a light-emitting diode (green LED) 231 that emits a green light. The illumination light irradiated by the green LED 231 is irradiated on the workpiece 4 through a lens 232.

The ring illuminator 24 has a ring-shaped casing 241 provided around the optical axis A and white LEDs 242 (light source) disposed inside the casing 241. A plurality of the white LEDs 242 are arranged in a ring shape around the optical axis A.

The ring illuminators 24 are divided into four sections, which include a front section, a back section, a left section 243 and a right section 244. The intensity of the illumination light of the divided front section, the back section, the left section 243 and the right section 244 is independently controlled. Incidentally, the left section 243 and the right section 244 are shown in FIG. 2.

The incident illuminator 25 has a halogen lamp 251 as a light source for irradiating the illumination light in a direction perpendicular to the optical axis A, and a half mirror 252 provided on the optical axis A for reflecting the illumination light from the halogen lamp 251 toward the workpiece 4.

The image pickup device 26 has a condenser lens 27 for condensing the light reflected by the workpiece 4, and a CCD camera 28 having light-receiving elements that receive a light from the condenser lens 27.

The CCD camera 28 obtains the image from the light reflected by the workpiece 4. The image is composed of a limited number of pixels, which may be arranged in an image size of 512×512. The respective pixels represent, for instance, 8-bit data that represents the intensity of the received light in a gradation value (light-receiving intensity) of 256 scales from 0 to 255. The data outputted by the CCD camera 28 is outputted to the controller 3.

The CCD camera 28 can take a dozens of frames (30 frames for instance) within a second.

The CCD camera is capable of changing a shutter speed thereof, so that the exposure time can be designated and adjusted by input operation. The adjustable exposure time ranges, for instance, from $1/1000$ to 2 seconds.

Figure 3:
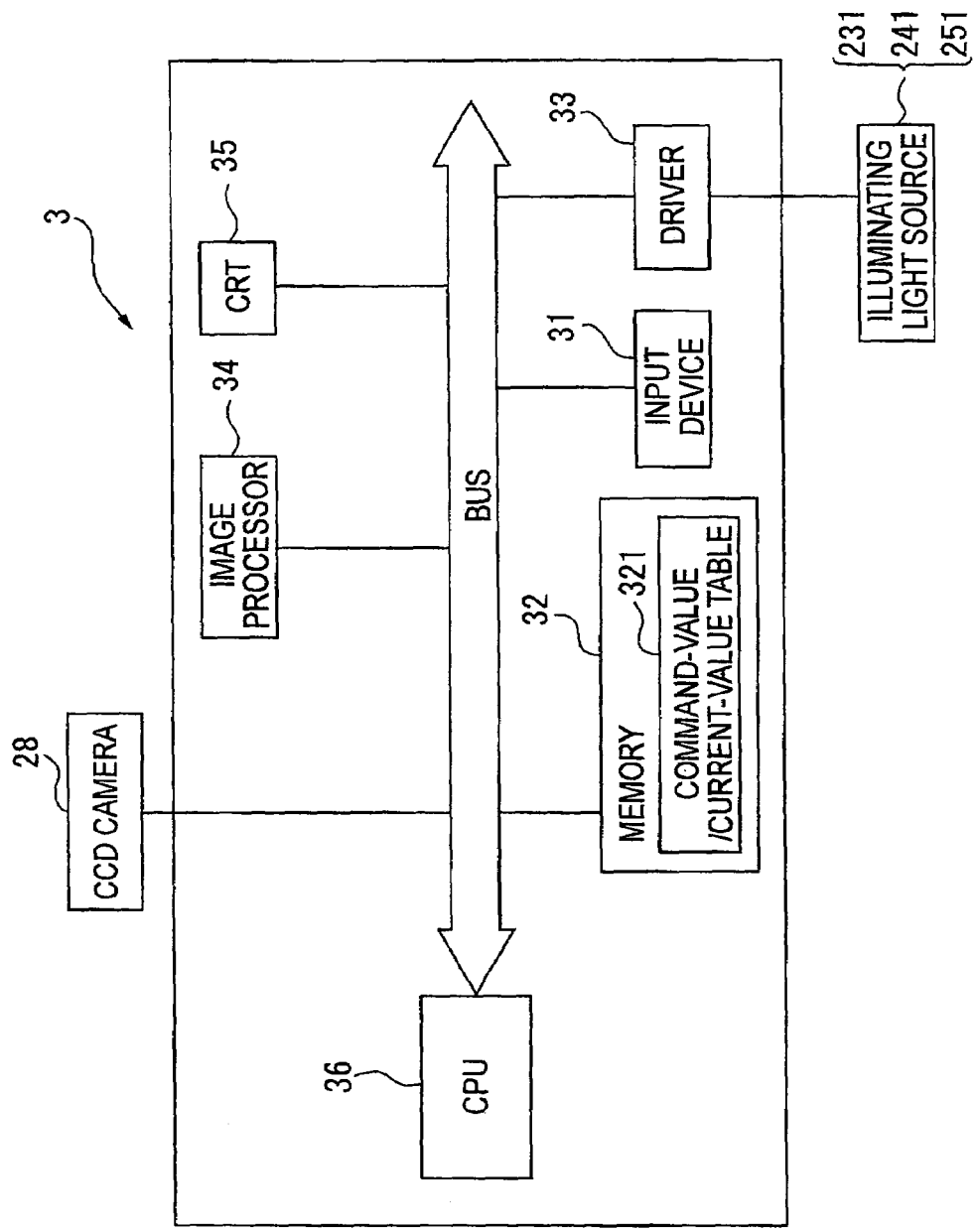
FIG. 3 is a block diagram showing an arrangement of a controller.

As shown in FIG. 3, the controller has an input device 31 for inputting a command value for commanding the illuminance (intensity) of the illumination light, a memory 32 for storing a command-value/current-value table 321 that stores the relationship between the command value and the electric current applied on the respective light sources 231, 242 and 251, a driver 33 for applying the electric current on the respective light sources 231, 242 and 251, an image processor 34 for calculating the profile, dimension and the like of the workpiece 4 by processing the image from the CCD camera 28, a display (CRT) 35 for outputting the processing result of the image processor 34, and a CPU (Central Processing Unit: illuminance-calibrating controller of the illuminator) 36 for controlling the entire controller 3.

The input device 31 is a manually operable lever, button and the like facing the outside. The command value that commands the illuminance of the illumination light from 0% to 100% is inputted through the input device 31. The relationship between the command value and the illuminance of the illumination light is controlled according to an illumination control curve shown in FIG. 14(B), where the illumination light in accordance with the illuminance control curve is irradiated by the illuminator 22 when the command value is inputted. Calibration method for adjusting the command value and the illuminance of the illumination light with the illuminance control curve will be described below.

The command value inputted by the input device 31 is sent to the CPU 36.

As shown in FIG. 4, the command-value/current-value table 321 is a table storing electric current value applied on the respective illuminators 22 for each command value.

Incidentally, the command-value/current-value table 321 is generated by calculating the electric current value to be applied on the respective illuminators 23 to 25 for generating desired illumination commanded by the command value by calibrating the respective light sources 231, 242 and 251 in accordance with the characteristics of the respective illuminators 23 to 25, i.e. characteristics of the light sources 231, 242 and 251 relative to the applied current value.

How the command-value/current-value table 321 is prepared will be described below.

The CPU 36 controls the entire controller 3. The CPU 36 has a calibration program for calibrating the illuminance of the illuminator 22, the calibration program being executed to calibrate the illuminance of the illuminator 22. According to the calibration program, the CPU 36 works as a light-receiving intensity measuring device, a characteristic curve calculating device, the command-value/current-value table generating device and the like, of which details will be described below.

When the command value is inputted by the input device 31, the CPU 36 reads out the applied current value corresponding to the command value from the command-value/current-value table 321 stored in the memory 32 for the respective illuminators 23 to 25 in accordance with the command value from the input device 31. The CPU 36 commands the applied current value to the driver.

In accordance with the command by the CPU 36, the driver 33 applies an electric current to the respective light sources 231, 242 and 251 of the respective illuminators 23 to 25 to irradiate the illumination lights from the respective illuminators 23 to 25.

The image processor 34 processes the image taken by the CCD camera 28 to detect the edge thereof and calculates the profile and dimension of the workpiece 4.

The display 35 displays the result calculated by the image processor 34.

Next, the illuminance calibrating method of the illuminator 22 for calibrating the illuminance of the illuminator 22 will be described below.

Figure 5:
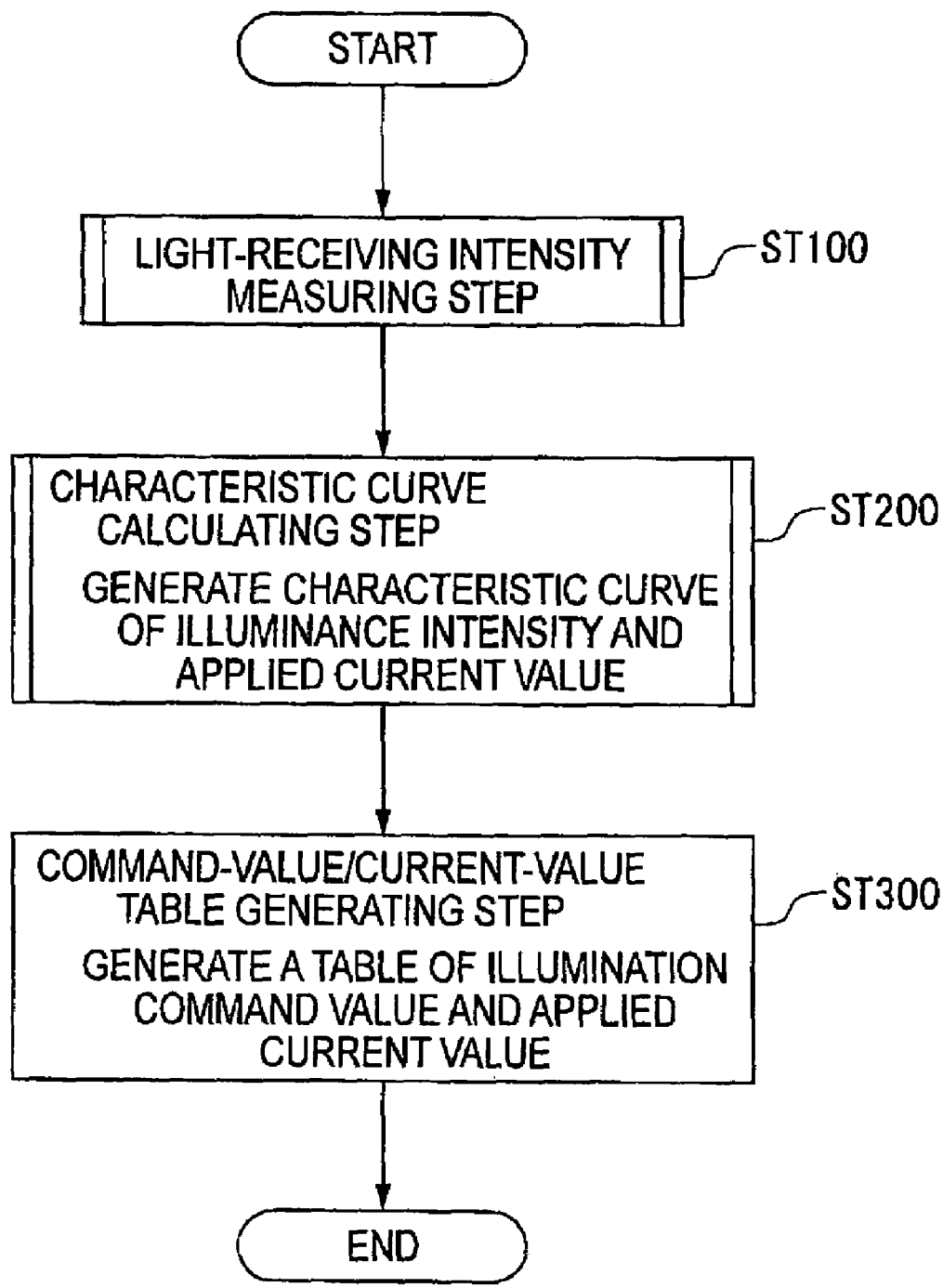
FIG. 5 is a flowchart showing an illuminance calibrating method of an illuminator.

As shown in the flowchart of FIG. 5, the illuminance calibrating method includes a light-receiving intensity measuring step ST100 for measuring a relationship between the applied current value and the light-receiving intensity of the CCD camera 28 while changing the shutter speed of the CCD camera 28, a characteristic curve calculating step ST200 for calculating a characteristic curve of the illumination intensity and the applied current value based on the result obtained in the light-receiving intensity measuring step ST100, and a command-value/current-value table generating step ST300 for generating a table of the command value and the applied current value based on the calculated characteristic curve.

The light-receiving intensity measuring step ST100 will be described below with reference to the flowchart shown in FIG. 6.

Initially, the illuminator of which illuminance is to be calibrated is selected (ST101). Specifically, one of the front section, the back section, the right section 244 and the left section 243 of the ring illuminator 24, the incident illuminator 25 and the transmissive illuminator 23 is selected.

Figure 7A:
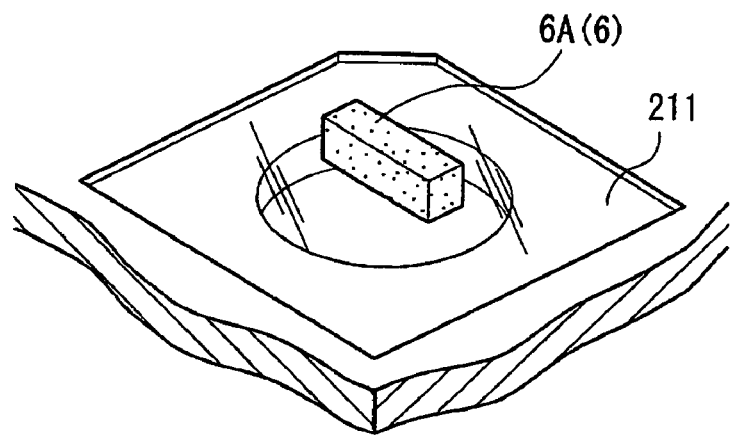
FIG. 7(A) is an illustration showing a reflective body that reflects an illumination light from a ring illuminator.
Figure 7B:
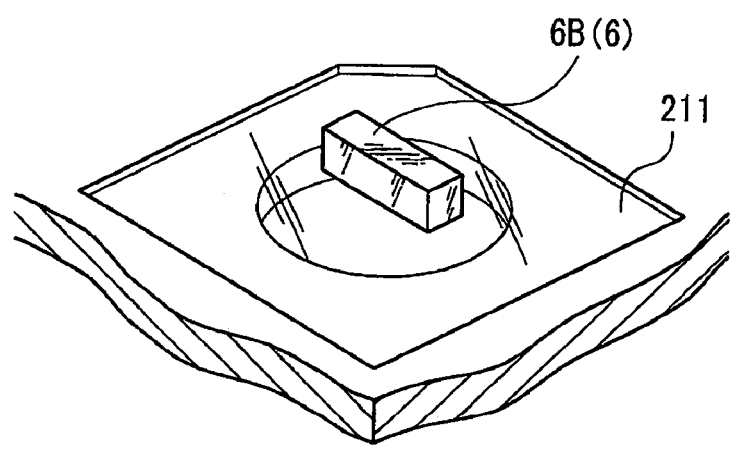
FIG. 7(B) is an illustration showing a reflective body that reflecting an illumination light from an incident illuminator.
Figure 7C:
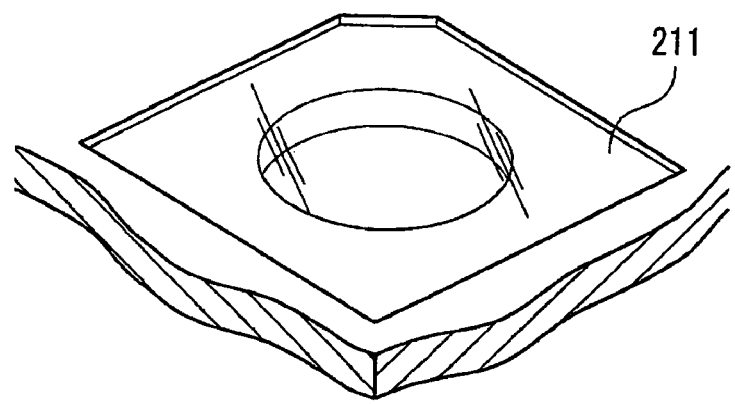
FIG. 7(C) is an illustration showing an arrangement where no reflective body is set so that an illumination light from a transmissive illuminator is directly transmitted.

After selecting the illuminator to be calibrated, a reflective body 6 is put on the stage 211 as necessary so that the light irradiated by the selected illuminator is incident on the CCD camera 28 with proper luminous energy (ST102). For instance, when one of the sections of the ring illuminator 24 is to be calibrated, a ceramic gauge block 6A is put on the stage 211 so that the light reflected by the gauge block 6A is incident on the CCD camera 28, as shown in FIG. 7(A). When the incident illuminator 25 is to be calibrated, a metal gauge block 6B is put on the stage 211 so that the light reflected by the gauge block 6B is incident on the CCD camera 28, as shown in FIG. 7(B). When the transmissive illuminator 23 is to be calibrated, nothing is put on the stage 211 so that the light from the transmissive illuminator 23 is directly incident on the CCD camera 28, as shown in FIG. 7(C). The relationship is shown in the table in FIG. 8 as a measuring condition.

Figure 9:
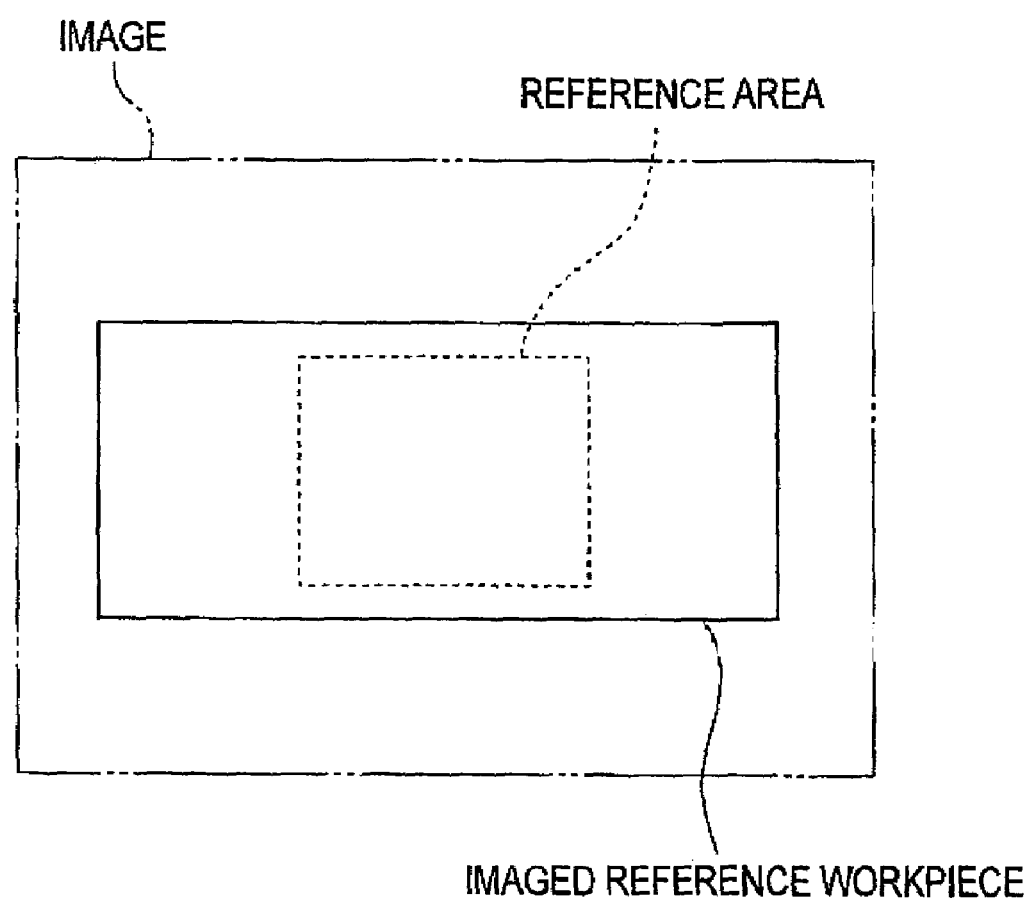
FIG. 9 is an illustration showing a reference area in an image.

Next, an illumination reference area is set (ST103). During the process, the area of which gradation scale is to be calculated is set in the image taken by the CCD camera 28 as shown in FIG. 9. Incidentally, FIG. 9 shows an example where the reflective body 6 is put on.

Subsequently, an initial condition of the measurement is set (ST104, ST105). Specifically, in the initial condition, the shutter speed of the CCD camera 28 is set at the slowest and the exposure time is maximized (ST104). Further, the applied current value is set at the minimum (ST105).

When a light is irradiated by the illuminator, the light is reflected by the reflective body 6 or is directly received by the CCD camera 28 and the image is taken by the CCD camera 28 (ST106).

The gradation value is calculated based on the image taken by the CCD camera 28 (ST107). The gradation value is calculated as a value averaging the gradation within the illumination reference area.

The calculated gradation value is memorized together with the exposure time and the applied current value (ST108).

Subsequently, whether the light-receiving luminous energy is saturated or not is determined (ST109). Specifically, whether the gradation value has reached to the maximum value (255) of the 256 scale or not is determined. When the gradation value has not reached to the maximum luminous energy (ST109: NO), the applied current value is incremented by a predetermined unit (ST110) to repeat the steps ST106 to ST109. In other words, the gradation value data is obtained while gradually increasing the applied current value (ST110) and keeping constant exposure time. For instance, the gradation value data obtained at two seconds exposure time is plotted in a curve represented by a gradation value graph $L_5$ in FIG. 10(A).

In ST109, when the luminous energy is saturated (ST109: YES), whether the applied current value is maximized or not is determined. When the exposure time is long (two seconds, for instance), the gradation value becomes the maximum before the applied current value reaches to the maximum value (see $L_5$ in FIG. 10(A)). Then, in this state, the relationship between the applied current value and the gradation value cannot be measured in an area where high electric current is applied.

Accordingly, when the applied current value is not maximized (ST111: NO), the shutter speed of the CCD camera 28 is accelerated by a predetermined amount to reduce the exposure time (ST112). Then, the steps ST105 to ST111 are repeated while reducing the exposure time. For instance, the gradation value graph showing the relationship between the applied current value and the gradation value when the exposure time is set at one second can be plotted in a curve represented by $L_4$ in FIG. 10(A).

When the exposure time is shortened, it is understood that the gradation value data can be obtained at a higher applied current value as compared to the gradation value data graph $L5$ (exposure time two seconds). However, it is noted that the resolution of the gradation value relative to the applied current value is lowered when the exposure time is shortened.

Figure 10A:
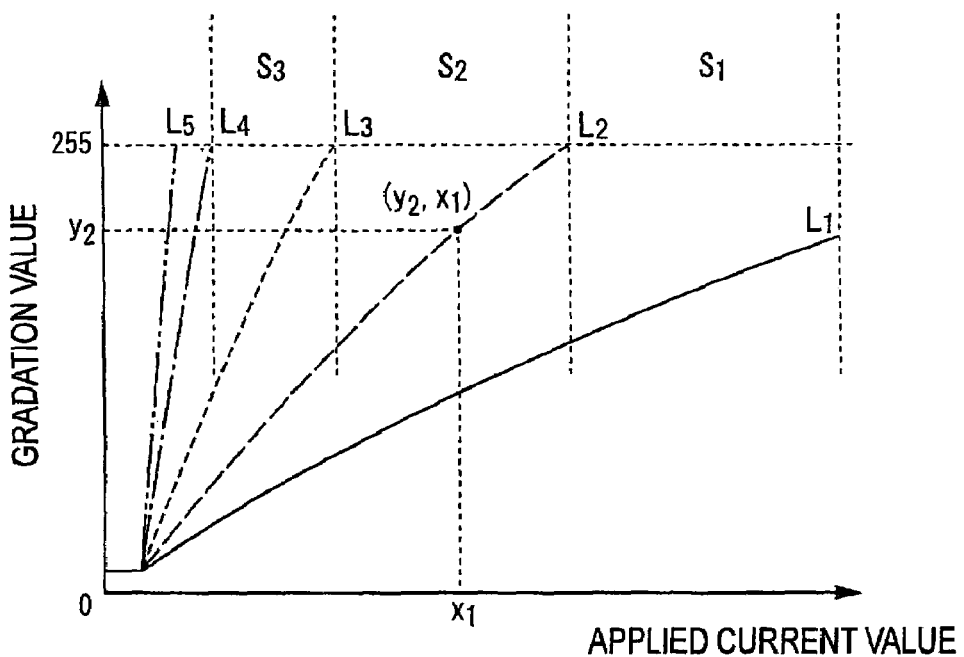
FIG. 10 is an illustration how gradation value data for each exposure time are superposed on a single characteristic curve using a conversion formula.

After incrementing the applied current value while reducing the exposure time to obtain the relationships between the applied current value and the gradation value for each exposure time, the respective gradation value graphs $L_1$ to $L_5$ shown in FIG. 10(A) can be obtained. Incidentally, FIG. 10(A) shows typical graphs extracted for the convenience of explanation. In the gradation value graph $L_1$ with the shortest exposure time in the graphs of FIG. 10(A), it is noted that the gradation value has not reached to the maximum even when the applied current value has reached to the maximum value. Incidentally, the maximum value of the applied current value refers to a point where, the value becomes, for instance, 4096 when a 12-bit D/A converter is used to control the applied current value (see FIG. 8).

Next, the characteristic curve calculating step ST200 will be described below.

Figure 11:
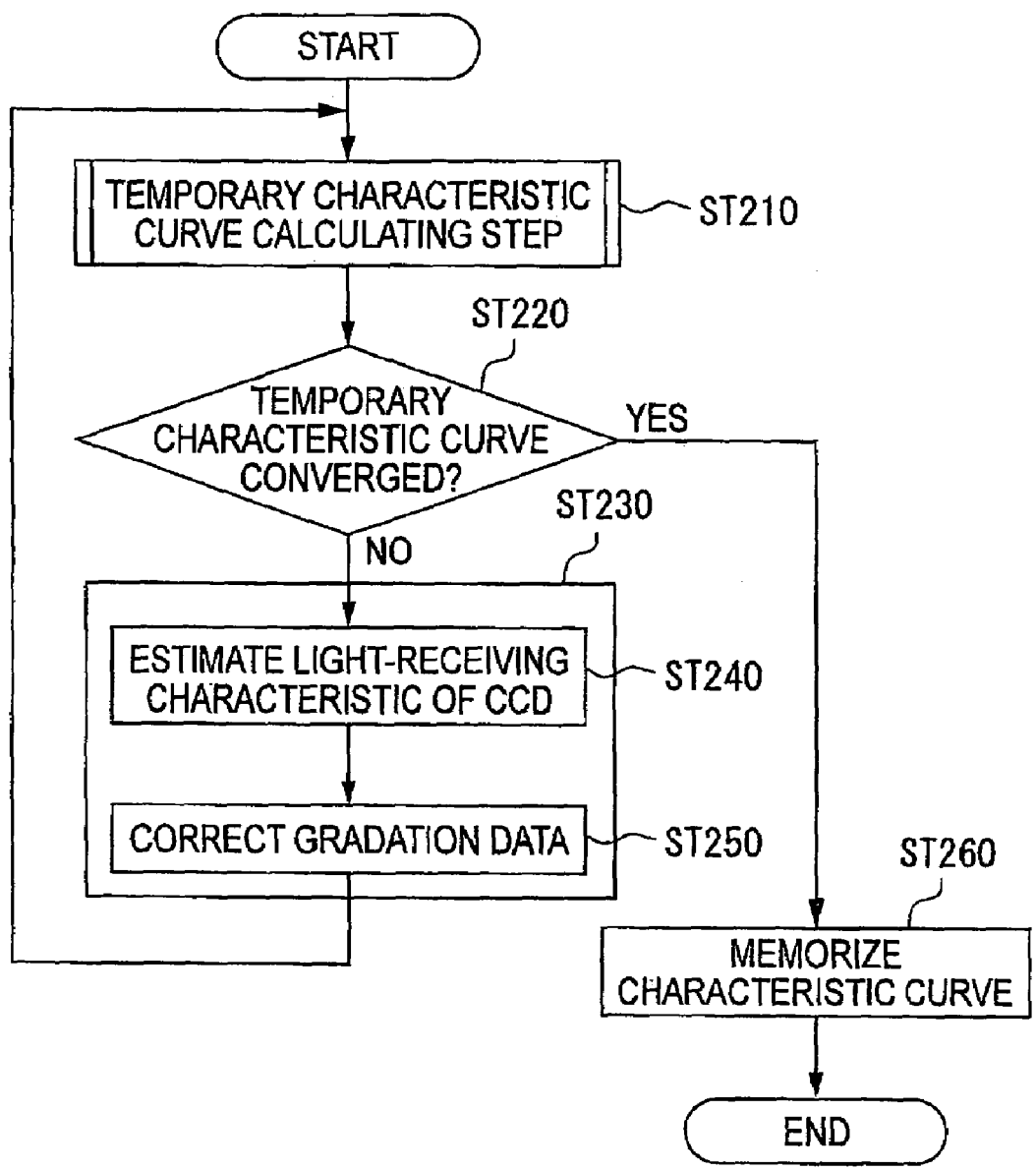
FIG. 11 is a flowchart showing a characteristic curve calculating step.

As shown in the flowchart of FIG. 11, the characteristic curve calculating step ST200 includes a temporary characteristic curve calculating step ST210 for converting the gradation value data obtained by the light-receiving intensity measuring step ST100 into a percentage to calculate a temporary characteristic curve, and a light-receiving characteristics correcting step ST230 for correcting the gradation value data.

Figure 12:
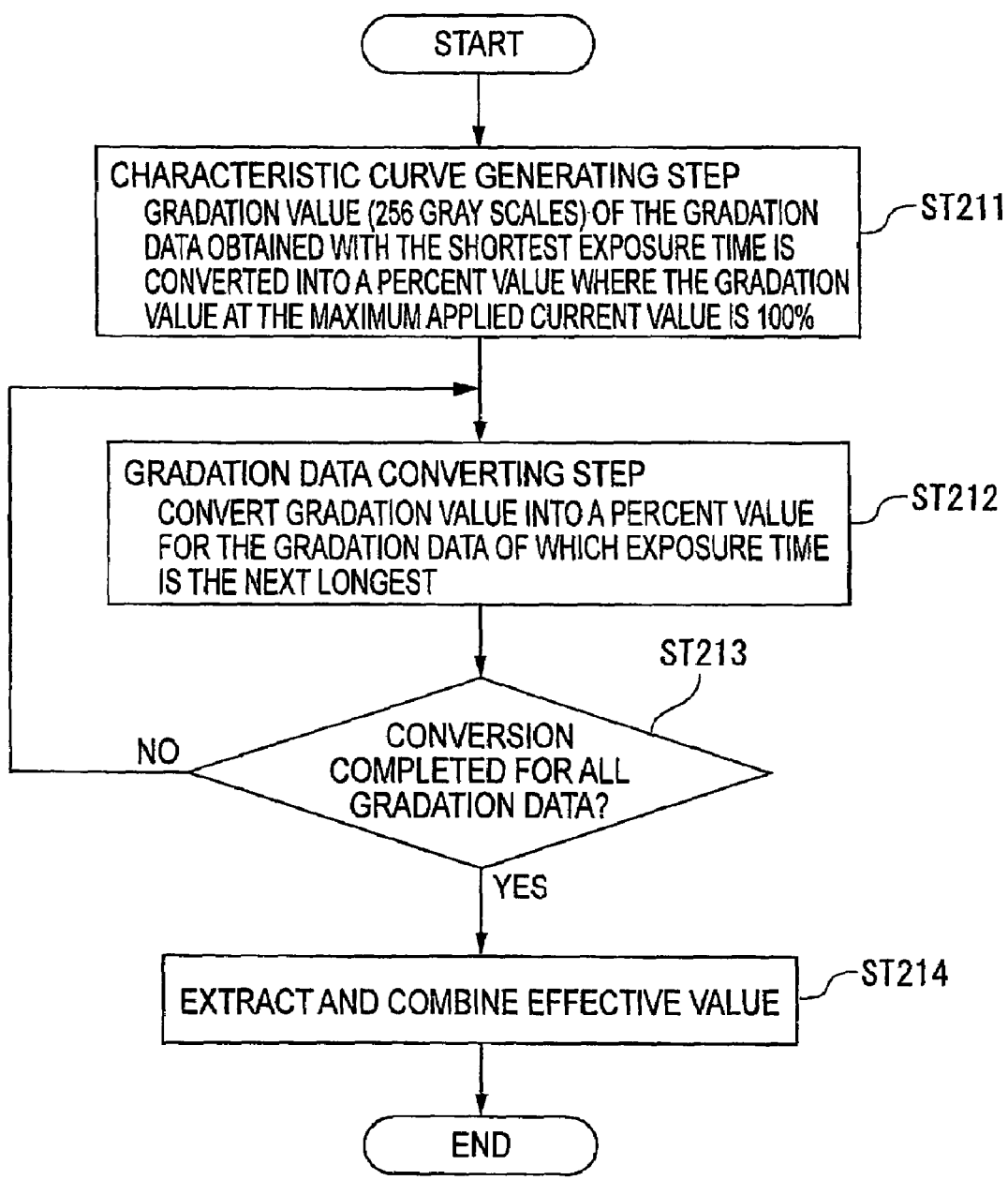
FIG. 12 is a flowchart showing a temporary characteristic curve calculating step.

As shown in a flowchart of FIG. 12, the temporary characteristic curve calculating step ST210 includes a reference characteristic curve generating step ST211 for generating a reference characteristic curve based on the gradation value data obtained with the shortest exposure time where the gradation value obtained at the maximum applied current value is 100%, a gradation value data converting step ST212 for converting the gradation value of the respective gradation value data into a percentage to superpose on the reference characteristic curve, and a data pasting step ST214 for extracting and pasting effective values.

In the reference characteristic curve generating step ST211, the data obtained with the shortest exposure time in the gradation value data obtained by the light-receiving intensity measuring step ST100 is converted into a percentage data (with the gradation value at the maximum applied current value being 100%). For instance, the gradation value graph $L_1$ in FIG. 10(A) is converted to obtain a characteristic curve $L_1'$ shown in FIG. 10(B) with the maximum gradation value being 100%.

Though the gradation value for the applied current value differs according to the exposure time, the illuminance of the light irradiated by the illuminator should be identical for the same applied current value and the gradation value is measured as a relative value. Accordingly, when the gradation value data measured for each exposure time is converted into a percentage, by converting the relative scale of the gradation value data for each exposure time so that the gradation value data shows the same percentage for the same applied current value, all of the gradation value data are supposed to be on a single characteristic curve. Specifically, the gradation value data with the shortest exposure time ($L_1$ in FIG. 10(A)) is set as a reference scale and the other gradation value data are superposed on the reference characteristic curve with the shortest exposure time.

In the gradation value data converting step ST212, a conversion formula for superposing the gradation value data with the next shortest exposure time (relative to the gradation value data with the shortest exposure time) on the reference characteristic curve is initially determined.

The above process will be described with reference to FIG. 10. A gradation value graph $L_1$ with the shortest exposure time and a gradation value graph $L_2$ with the next shortest exposure time are shown in FIG. 10(A). The point on the gradation value graph $L_2$ is represented as (gradation value, applied current value)=$(y_2, x_1)$.

Figure 10B:
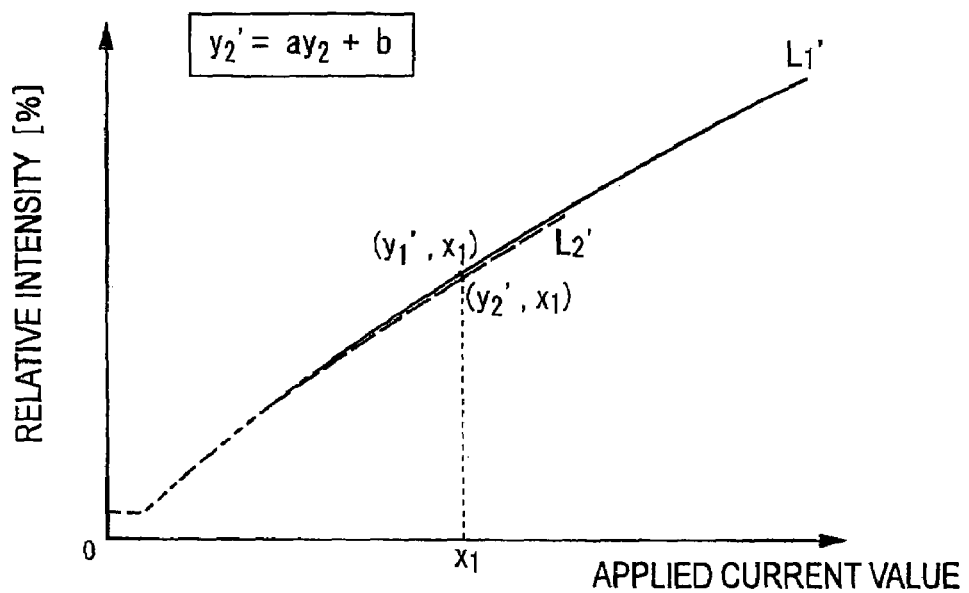

FIG. 10(B) shows a characteristic curve after converting the gradation value into a percentage, where the reference characteristic curve with the shortest exposure time is shown as $L_1'$. Further, it is assumed that the graph after converting the gradation value into a percentage is shown as a characteristic curve $L_2'$. The point on the gradation value graph $L_2'$ is represented as (relative intensity, applied current value)= $(y_2', x_1)$.

In the above, the relative intensity for the same applied current value should be equal. Accordingly, $L_2'$ should be superposed on $L_1'$. Therefore, the conversion formula for converting $L_2$ into $L_2'$ is determined using parameters a and b as in the following formula (1).

$$y_2' = a \cdot y_2 + b \qquad \text{conversion formula (1)}$$

Then, the parameters a and b of the conversion formula (1) can be determined according to least square method.

Specifically, when $$S(a, b) = \Sigma(y_1' = y_2')^2 = \Sigma(y_1' - a \cdot y_2 - b)^2$$

the conversion formula (1) can be solved by determining a pair of (a, b) for minimizing S(a, b).

The conversion formula is thus solved and the gradation value is converted into a percentage.

The above operations are conducted on all of the gradation value data for each exposure time (ST213).

Next, the effective values are extracted and pasted the data to generate a single characteristic curve (ST214). As described above, though the gradation value data for each exposure time can be superposed on a single curve by converting into a percentage value, higher gradient of the gradation value and measurement accuracy can be obtained with longer exposure time. Accordingly, the characteristic curve with higher accuracy can be obtained using a gradation value data with longer exposure time.

For instance, in FIG. 10(A), though the points on the gradation value graph $L_1$ with the shortest exposure time are used for the area $S_1$, the points on the gradation value graph $L_2$ with longer exposure time are used for the area $S_2$, so that the gradation value data with the highest scale accuracy can be obtained for each area.

As described above, while using the gradation value data measured with the longest exposure time for the same applied current value, the effective value of the characteristic curve is generated.

Figure 13A:
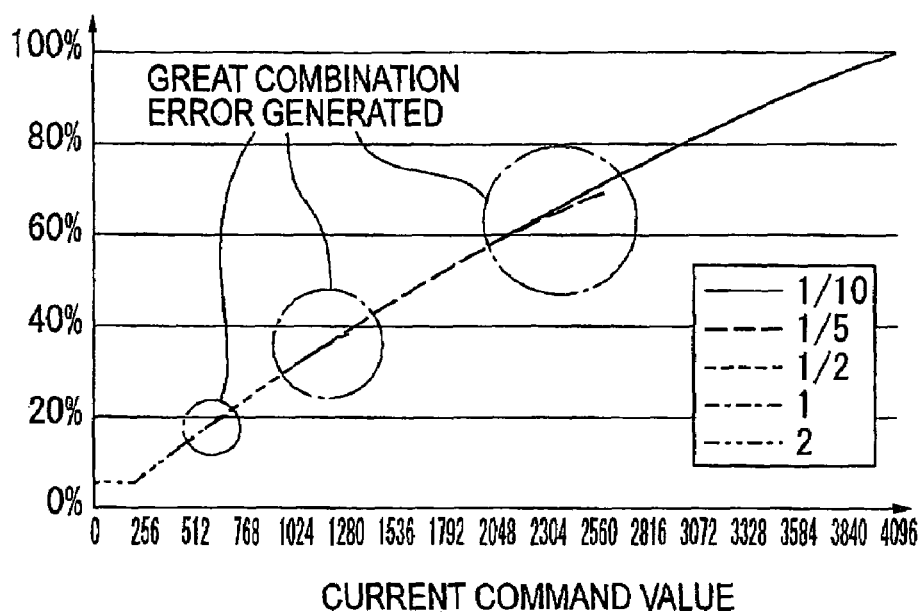
FIG. 13(A) is an illustration showing an error when gradation value data are pasted without correcting the gradation value data.

Then, the temporary characteristic curve as shown in FIG. 13(A) can be obtained.

Next, the light-receiving characteristics correcting step ST230 (FIG. 11) will be described below.

The light-receiving characteristics correcting step ST230 includes a light-receiving characteristics estimating step ST240 for estimating the light-receiving characteristics of the CCD camera 28, and a gradation value data correcting step ST250 for correcting the gradation value data considering the light-receiving characteristics of the CCD camera 28 estimated in the light-receiving characteristics estimating step ST240.

When the temporary characteristic curve in FIG. 13(A) is observed, all the points after pasting the effective values are not on a single curve and a pasting error is generated. The above error is caused on account of light-receiving characteristics of the CCD camera 28, where a light-receiving sensitivity, i.e. a charge conversion rate against light, is generally lowered when the luminous energy is high. In other words, since the gradation value data is obtained while changing the exposure time of the CCD camera 28, the gradation value data obtained where the luminous energy is high shows lower gradation value than the actual value. When the gradation value graph with longer exposure time is combined with the gradation value graph with the next longer exposure time, the gradation value data with the longer exposure time exhibits lower gradation value data than the actual value since the luminous energy is high where high electric current is applied. As a result, the gradation value graph with longer exposure time cannot be combined with the gradation value graph with next longer exposure time into a single curve only by converting the gradation value data with high luminous energy according to the conversion formula 1), and the gradation value data with the longer exposure time cannot be deemed as an accurate value.

Figure 13B:
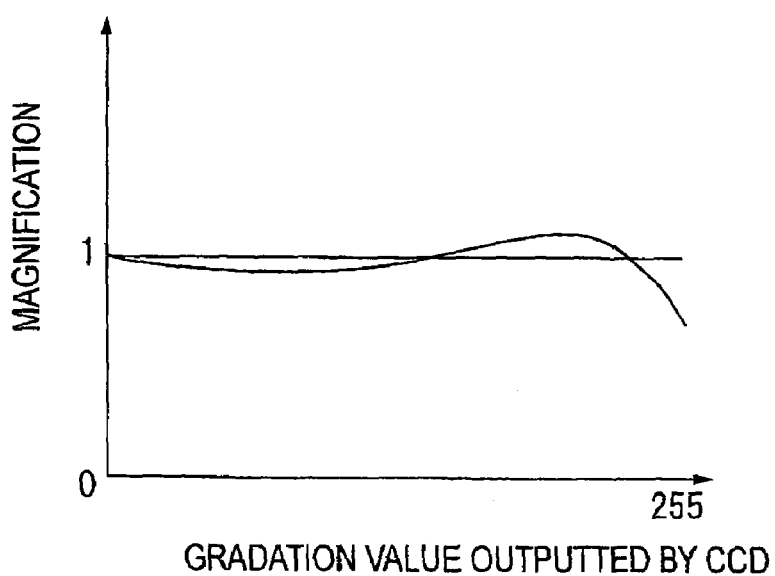
FIG. 13(B) is an illustration showing a light-receiving characteristics of a CCD camera.

In the temporary characteristic curve in FIG. 13(A), great pasting error is generated where the gradation value graphs with different exposure time are pasted, and the characteristic of the charge conversion rate of the CCD camera 28 can be calculated based on the pasting error. When an ideal charge conversion rate of the CCD camera 28 is 1, the light-receiving characteristics of the CCD camera 28 calculated based on the pasting error of the temporary characteristic curve of FIG. 13(A) can be represented as shown in FIG. 13(B), which exhibits a light-receiving characteristics where the gradation value is greatly deviated when the luminous energy is high.

Accordingly, in the light-receiving characteristics estimating step ST240, the charge conversion rate is calculated based on a deviation $\epsilon$ of the relative intensity when the characteristic curve with the longer exposure time is compared with the characteristic curve with the next longer exposure time in the characteristic curves $L_1'$ to $L_5'$ obtained by converting the gradation value into the relative intensity by the data conversion formula (1).

Further, in the gradation value data correcting step ST250, the gradation value data is corrected so that the charge conversion rate becomes equal, i.e. '1' in the present embodiment, for all the gradation value data. The correction is conducted on the gradation value data for each exposure time.

Figure 14A:
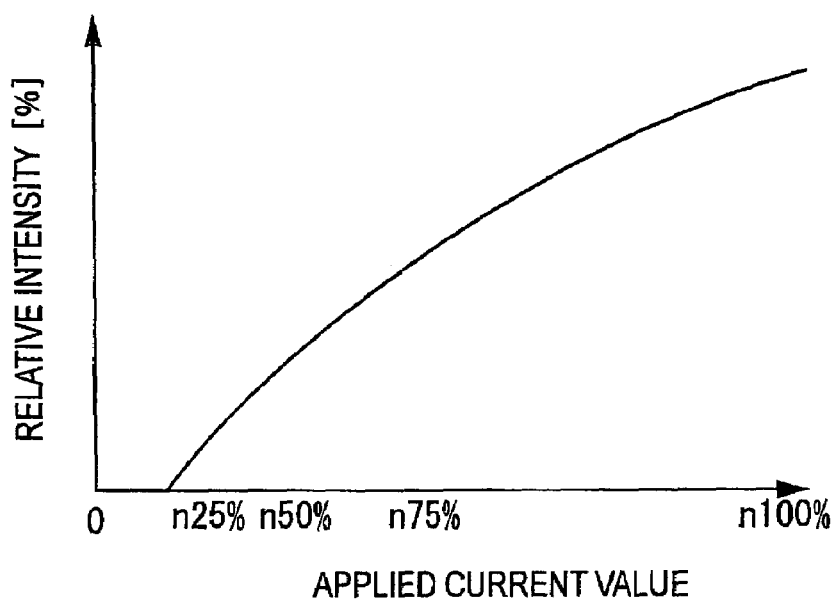
FIG. 14(A) is an illustration showing a characteristic curve representing a relationship between an applied current value and the intensity of the illumination light.

Subsequently, the temporary characteristic curve is calculated based on the gradation value data corrected by the gradation value data correcting step ST250 (ST210). When the temporary characteristic curve is converged into a single curve as shown in FIG. 14(A) (ST220: YES), the characteristic curve is memorized (ST260).

Next, command-value/current-value table generating step (FIG. 5, ST300) will be described below.

Figure 14B:
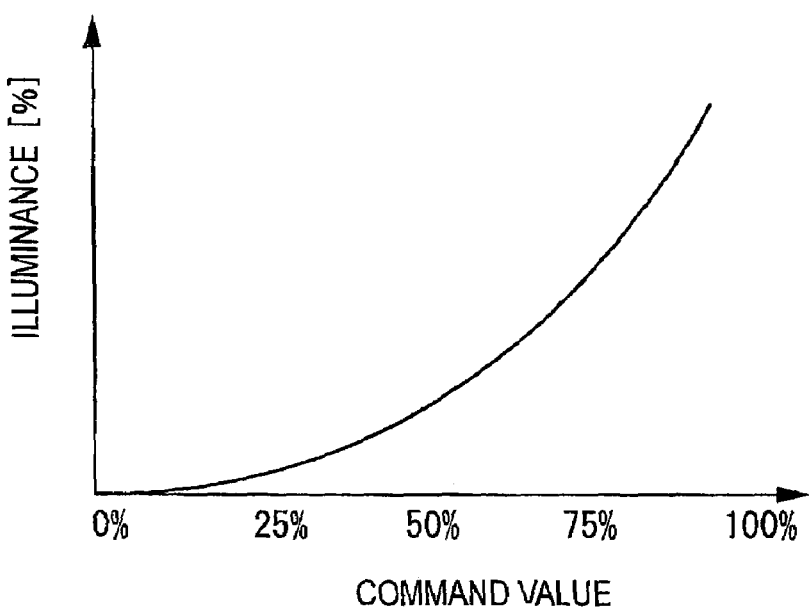
FIG. 14(B) is an illustration showing a control curve for controlling the illumination intensity relative to a command value.

Initially, the illuminance of the illumination light relative to a command value is set. In the process, the illuminance control curve of the desired illumination light is set by the command value as shown in FIG. 14(B). The control curve may be stored in the CPU in advance, or alternatively, may be inputted by an input device.

Next, the relative intensity of the characteristic curve of FIG. 14(A) is associated with the illuminance in FIG. 14(B). Specifically, the desired illuminance control range in FIG.

14(B) may be set as 0 to 100% or, alternatively, the relative intensity in FIG. 14(A) may be interpreted as the illuminance of the desired illuminance control range.

The illuminance corresponding to the command value is read out from FIG. 14(B) and applied current value is read out from the characteristic curve based on the relative intensity corresponding to the illuminance. Then, the applied current value corresponding to the command value is determined, which is stored in the command-value/current-value table 321 in the memory 32.

The above process is conducted for each illuminator to generate a table of the applied current value and the command value for the respective illuminators, which is represented as the command-value/current-value table 321 as shown in FIG. 4. Then, the illumination light is irradiated on the workpiece from the illuminator at an intensity according to the illumination control curve in accordance with the command value.

The function of the above-described image-processing measuring tool will be described below. Initially, the workpiece 4 is put on a stage 211. Next, the command value is inputted from the input device 31. The inputted command value is sent to the CPU 36 and the CPU 36 reads out the applied current value corresponding to the command value for each illuminator from the command-value/current value table 321. The obtained applied current value is sent to the driver 33 and the electric current is applied on the light sources of the respective illuminators by the driver 33. Then, the illumination light is irradiated toward the workpiece 4 from the respective illuminators. The light reflected by the workpiece 4 is taken by the CCD camera 28. The taken image data is sent to the image processor 34 and an image-processing such as edge detection is conducted to measure the profile of the workpiece 4. The measured result is displayed on the display 35.

According to the above arrangement, following advantages can be obtained.

(1) The illumination light is taken by the CCD camera 28 in order to obtain the gradation value of the illumination light. Since the CCD camera 28 can take the image at the frame rate of dozens of frames per one second, the measurement speed can be accelerated as compared to an arrangement using an illuminance meter. Further, the CCD camera 28 is inexpensive as compared to the illuminance meter and the CCD camera 28 originally attached to the image-processing measuring tool 1 can be used. Accordingly, the illuminance calibration can be inexpensively conducted and the trouble and cost for separately purchasing the illuminance meter are not required.

In other words, a user of the image-processing measuring tool can calibrate a deviation of the illuminator on account of secular change thereof by himself in a rapid and inexpensive manner.

(2) The relationship between the applied current value and the illumination light is obtained by changing the exposure time of the CCD camera 28. By reducing the exposure time of the CCD camera 28, the relationship between the applied current value and the illumination intensity can be obtained over a wide range with low resolution of gradation value. When the exposure time is lengthened, the relationship between the applied current value and the illumination intensity can be obtained with high resolution within a narrow range. By extracting effective values from thus-obtained data, the relationship between the applied current value and the illumination intensity over a wide range and with high gradation value resolution can be obtained.

(3) The reflective body 6 put on the stage 211 is exchanged for the respective illuminators or the reflective body 6 is not put on. By using the reflective body 6 as necessary, a light with appropriate luminous energy can be introduced on the CCD camera 28 from the respective illuminators.

(4) Though the CCD camera 28 changes the photoelectric conversion rate thereof where great luminous energy is applied, the characteristic of the CCD camera 28 is estimated (ST240) and the gradation value data is corrected based on the estimated result (ST250). Accordingly, accurate calibration can be conducted using the CCD camera 28, which is not as accurate as the illuminance meter.

(5) Since the illuminance can be easily calibrated, the illuminance of the illuminator 22 can be always accurately maintained. Therefore, the measurement accuracy of the image-processing measuring tool 1 can be always precisely maintained.

Incidentally, the scope of the illuminance calibrating method of an illuminator, the illuminance calibrating controller of an illuminator, the illuminance calibrating program of an illuminator, the recording medium storing the program and the measuring tool according to the present invention is not restricted to the above-described embodiments, but various modifications are possible as long as an object of the present invention can be achieved.

Though the image-processing measuring tool integrating the illuminator 22, the CCD camera 28 and the controller 3 is taken as an example, the present invention can be applied for calibrating an illuminator used as an independent component.

The CCD camera 28 (image pickup device) may be arranged to be capable of solely taking a monochrome image or capable of also taking a color image. In short, any image pickup device may be used as long as the gradation value can be outputted based on the luminous energy.

Though the applied current value is gradually increased (ST110) and the exposure time is gradually shortened (ST112) in the light-receiving intensity measuring step ST100 starting from the one with longer exposure time (ST104) and smaller applied current (ST105), such order may be arranged as desired.

Though the conversion formula is obtained using a least-square method in the characteristic curve calculating step ST210 in the above embodiment, any arrangement is possible as long as the gradation value data of all of the exposure time is converted to be superposed on a single characteristic curve. For instance, a regression line of the gradation value graph calculated for each exposure time and the conversion formula may be calculated by conversion so that the inclinations of all of the regression lines become equal.

What is claimed is:

1. An illuminance calibrating method of an illuminator having a light source capable of changing illuminance thereof according to an applied current value, the illuminator irradiating an illumination light of an illuminance in accordance with a command value inputted from the outside for commanding the illuminance of the illumination light, the method comprising:

a light-receiving intensity measuring step for taking an image of the illumination light from the illuminator by an image pickup device capable of changing an exposure time thereof to measure the relationship between the applied current value and a light-receiving intensity of the image pickup device while changing the exposure time;

a characteristic curve calculating step for calculating a characteristic curve of an intensity of the illumination light of the illuminator and the applied current value based on the result of the light-receiving intensity measuring step; and a command-value/current-value table generating step for generating a table storing the command value and the applied current value based on the calculated characteristic curve.

2. The illumination calibrating method of an illuminator according to claim 1, the characteristic curve calculating step comprising: a reference characteristic curve generating step for generating a reference characteristic curve having a reference scale of the light-receiving intensity obtained in the exposure time capable of obtaining the light-receiving intensity on the entirety of the applied current value to be calibrated; and a light-receiving intensity converting step for converting the scale of the light-receiving intensity obtained at the each exposure time to superpose on the reference characteristic curve.

3. The illumination calibrating method of an illuminator according to claim 2, further comprising a pasting step for extracting and pasting an effective value from the value converted by the light-receiving intensity converting step, wherein the value converted by the light-receiving intensity obtained at the longest exposure time for the same applied current value is selected as the effective value.

4. The illumination calibrating method of an illuminator according to claim 3, the characteristic curve calculating step comprising: a light-receiving characteristics estimating step for estimating the characteristic of the image pickup device based on a pasting error of the characteristic curve in the pasting step; and a light-receiving intensity correcting step for correcting the light-receiving intensity based on the light-receiving characteristics estimated in the light-receiving characteristics estimating step.

5. The illumination calibrating method of an illuminator according to claim 1, further comprising:

an illuminance control curve setting step for setting an illuminance control curve representing a relationship between the command value and the illuminance commanded by the command value; and an applied current value reading step for reading the applied current value from the characteristic curve in accordance with the illuminance read out corresponding to the command value based on the illuminance control curve.

6. An illuminance calibrating controller of an illuminator having a light source capable of changing illuminance thereof according to an applied current value, the illuminator irradiating an illumination light of an illuminance in accordance with a command value inputted from the outside for commanding the illuminance of the illumination light, the controller comprising:

a light-receiving intensity measuring device for taking an image of the illumination light from the illuminator by an image pickup device capable of changing an exposure time thereof to measure the relationship between the applied current value and a light-receiving intensity of the image pickup device while changing the exposure time;

a characteristic curve calculating device for calculating a characteristic curve of an intensity of the illumination light of the illuminator and the applied current value based on the result obtained by the light-receiving intensity measuring device; and a command-value/current-value table generating device for generating a table storing the command value and the applied current value based on the calculated characteristic curve.

7. A measuring tool, comprising: the illumination calibration controller of an illuminator according to according to claim 6;

the illuminator for irradiating the illumination light toward a workpiece;

the image pickup device for taking an image of the light reflected by the workpiece; and an image processor for processing the image taken by the image pickup device to measure a profile of the workpiece.

8. An illuminance calibrating program of an illuminator having a light source capable of changing illuminance thereof according to an applied current value, the illuminator irradiating an illumination light of an illuminance in accordance with a command value inputted from the outside for commanding the illuminance of the illumination light, and a controller that controls the illuminance of the illuminator, the controller installed with a computer, the program operating the computer as:

a light-receiving intensity measuring device for taking an image of the illumination light from the illuminator by an image pickup device capable of changing an exposure time thereof to measure the relationship between the applied current value and a light-receiving intensity of the image pickup device while changing the exposure time;

a characteristic curve calculating device for calculating a characteristic curve of an intensity of the illumination light of the illuminator and the applied current value based on the result obtained by the light-receiving intensity measuring device; and a command-value/current-value table generating device for generating a table storing the command value and the applied current value based on the calculated characteristic curve.

9. A computer-readable recording medium storing an illuminance calibrating program of an illuminator having a light source capable of changing illuminance thereof according to an applied current value, the illuminator irradiating an illumination light of an illuminance in accordance with a command value inputted from the outside for commanding the illuminance of the illumination light, and a controller that controls the illuminance of the illuminator, the controller installed with a computer, the program operating the computer as:

a light-receiving intensity measuring device for taking an image of the illumination light from the illuminator by an image pickup device capable of changing an exposure time thereof to measure the relationship between the applied current value and a light-receiving intensity of the image pickup device while changing the exposure time;

a characteristic curve calculating device for calculating a characteristic curve of an intensity of the illumination light of the illuminator and the applied current value based on the result obtained by the light-receiving intensity measuring device; and a command-value/current-value table generating device for generating a table storing the command value and the applied current value based on the calculated characteristic curve.

* * * * *